Figure 1:
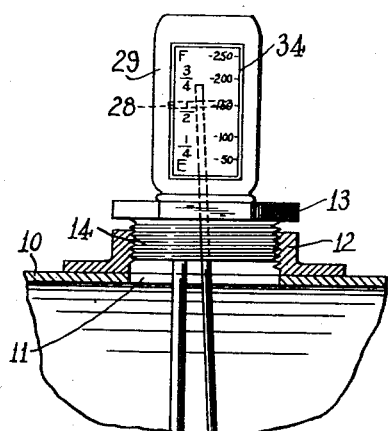

Aug. 10, 1948.	H. MOLAVER	2,446,844
LIQUID GAUGE
Filed June 18, 1946

Inventor
Harry Molaver
By Rockwell & Luthorow
Attorneys

Patented Aug. 10, 1948

2,446,844

UNITED STATES PATENT OFFICE 2,446,844

LIQUID GAUGE

Harry Molaver, New Haven, Conn., assignor, by mesne assignments, to The Oil Equipment Manufacturing Corporation, New Haven, Conn., a corporation of Connecticut Application June 18, 1946, Serial No. 677,583

1 Claim. (Cl. 73—317)

This invention relates to liquid gauges, and more particularly to a gauge designed to be used with a liquid-containing tank, such as an oil tank, for example, the gauge being constructed so that it may be readily carried by a threaded bushing threaded into a collar or neck member secured to the tank. The gauge structure is so arranged that it may be assembled and applied to the tank after the latter has been installed.

The gauge herein shown is one of the float type in that it is provided with a pivoted or swinging arm carrying a float at its outer end, which float rises and falls with the level of the liquid within the tank. The rising and falling of the float operates a generally vertically-disposed rod pivoted to the swinging arm, which vertical rod terminates in an indicator arranged in a transparent tube or container above the tank. A scale is provided directly upon the material of the transparent container to cooperate with the indicator, and this scale may be arranged to read in fractions of tank capacity or in gallons, or both.

It is necessary that such gauges be capable of assembly so that they will not leak, as it often occurs that the oil tank is filled above the level of the gauge, the oil standing in the filler pipe above the top of the tank, and if the gauge were not liquid-tight the oil would, in that event, leak from the tank.

It is also desirable that such a gauge be constructed so that it may be readily installed upon the tank after the latter is in place, and in many cases, particularly where it is necessary to replace a defective gauge, it is desirable that they be readily installed even when the tank may contain a certain amount of oil. As is usual, the gauge mechanism is carried by a bushing which is adapted to be threadingly connected to the tank, and if the gauge mechanism is secured to the bushing it must be rotated with the bushing when the latter is threaded in place, so that the float must, in that event, revolve in the tank. This is sometimes impossible, and is always undesirable.

In the present instance, therefore, I have provided a structure in which the gauge mechanism is supported by a disk-like member which is not secured in place until the gauge is installed. That is, the disk-like member may be put in its place within the bushing and the latter screwed upon the tank, the bushing being rotatable with respect to the disk-like member to effect the threading operation. Thereafter, a transparent tube or container within which the indicator is disposed may be itself threaded into the bushing to effect a liquid-tight connection between the parts and hold the disk-like member in place.

The transparent tube or container is closed at the top but open at the bottom where it is provided with a lower threaded neck designed to cooperate with threads formed internally in the bushing so that it may be screwed down to effectually seal the parts against leakage. Thus the gauge may be very simply made of relatively few parts and, at the same time, be effective in operation and very readily installed.

One object of the present invention is to provide a tank gauge of very simple construction so that it may be economically manufactured and, at the same time, be reliable and accurate in use.

A further object of the invention is to provide a tank gauge of the character described which may be very simple in construction and which, at the same time, will be proof against leakage even though the oil level may be above the position of the gauge.

Still another object of the invention is to provide a tank gauge of the character described such that it may be readily and easily installed upon a tank which is already in place.

To these and other ends the invention consists in the novel features and combinations of parts to be hereinafter described and claimed.

Figure 2:
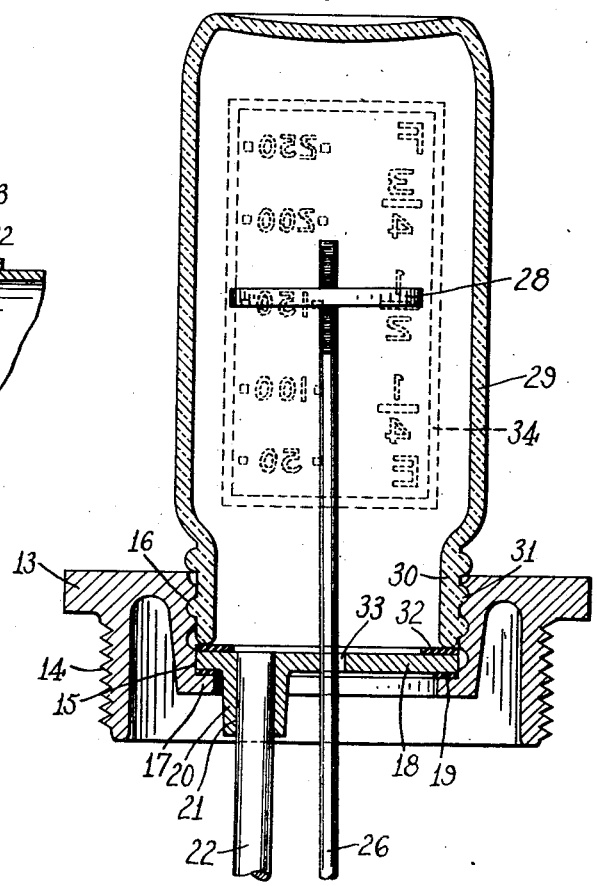
Figure 2:
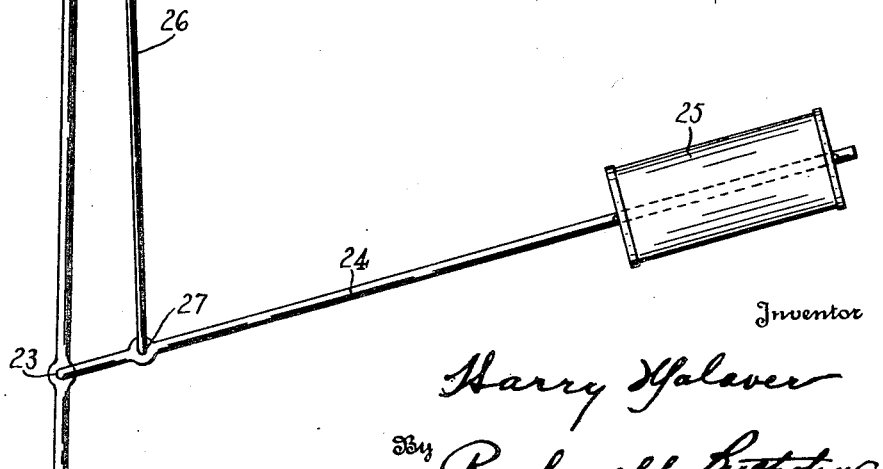

In the accompanying drawings:

Fig. 1 is a front elevational view of a liquid gauge embodying my invention, a portion of the tank upon which it is mounted being shown in section; and Fig. 2 is a sectional view through the gauge.

To illustrate a preferred embodiment of my invention, I have shown a portion of a tank at 10, the tank being provided with an opening 11 in its upper side, which opening is surrounded by an internally threaded neck or collar 12.

Within the collar 12 is designed to be threaded a bushing 13, the latter being provided with external threads 14 to cooperate with those of the collar 12. This bushing, as will be hereinafter explained, serves to support the gauge mechanism.

For this purpose, the bushing is provided with a recess 15 having relatively coarse threads 16 upon its side wall, the recess terminating in a lower, inwardly extending annular flange 17.

The gauge mechanism proper is secured to and supported by a disk-like member 18 which rests upon the flange 17 at its peripheral edge, and a washer 19 may be placed between the member 18 and the flange in order to make a tight joint when the disk member is forced against the flange as will be hereinafter explained.

The disk member 18 is provided with a downwardly depending lug 20 provided with an opening 21 within which is tightly fitted a depending rod 22. Pivoted to this rod at 23 is a float lever 24 carrying the float 25 at its free end. A vertically extending rod 26 is pivoted to the float lever at 27, this rod carrying an indicating member 28 at its upper end.

The disk 18 is freely disposed within the recess 15 so that, when the bushing 13 is screwed into place in the collar 12, the disk is not rotated with the bushing. After, however, the device has been installed in the tank, it is, of course, necessary to secure the disk tightly in place.

A closed tube or container 29 of transparent material is inverted over the disk 18. This container is provided with a lower neck portion 30 having threads 31 adapted to engage with the threads 16 of the recess 15. A washer 32 may be disposed between the disk member 18 and the lower edge of the neck 30, so that when the container is screwed tightly in place within the recess 15 the washers 19 and 32 will cooperate to make a tight seal between the container 29 and the exterior of the bushing 13. It will be noted that the container is provided with an integrally formed closure at its upper end, the container being made of glass or similar material, and that it not only houses the indicating member 28 but also serves to hold the disk-like supporting member 18 in place, and seal the gauge mechanism against leakage.

The rod 26 extends through an opening 33 in the disk-like member 18 so that the indicating member 28 on its upper edge lies within the transparent container 29. Provided directly on the wall of this container is a scale 34 which cooperates with the indicator 28, so that the amount of liquid in the tank may be easily read.

By the provision of the supporting disk 18 as a separate member from the bushing 13, I arrange for ready and easy installation of the device upon a tank, and by the provision of a closed container or bottle 29 having a screw-threaded connection with the bushing 13, I not only provide a simple arrangement for sealing the gauge against the leakinge of oil but also provide a simple arrangement for holding in place the disk-like member 18 which supports the gauge mechanism.

While I have shown and described a preferred embodiment of my invention, it will be understood that it is not to be limited to all of the details shown, but is capable of modification and variation within the spirit of the invention and within the scope of the claim.

What I claim is:

A liquid gauge for tanks or the like, comprising a bushing adapted to be threadedly secured to the tank, said bushing being provided with a recess and an inwardly projecting annular flange at the lower portion of the recess, a supporting member for the gauge mechanism resting freely upon said flange, gauge mechanism supported by said member including an indicator rod extending upwardly through said member, a container having an integrally formed closure at its upper end and an open lower end, said container having a lower threaded neck portion, said bushing having internal threads in said recess above said flange with which the threads of said neck portion are engaged to clamp the supporting member in place and seal the space between the bushing and the supporting member, and said indicator rod extending into the container and having an indicator on its upper end.

HARRY MOLAVER.

REFERENCES CITED

The following references are of record in the file of this patent:

UNITED STATES PATENTS

| Number | Name | Date |
|---|---|---|
| 1,172,481 | Oeschger | Feb. 22, 1916 |
| 1,411,917 | Harris | Apr. 4, 1922 |
| 1,482,852 | Kloepper | Feb. 5, 1924 |
| 2,182,172 | Decker | Dec. 5, 1939 |
| 2,212,318 | Gee | Aug. 20, 1940 |
| 2,255,310 | D'Arcey | Sept. 10, 1941 |
| 2,374,142 | Steven | Apr. 17, 1945 |